Aug. 2, 1927. 1,637,370

G. A. CHEETHAM

VOLT AMPERE HOUR METER

Filed Aug. 19, 1922

WITNESSES:
C. M. Cochran
F. H. Miller

INVENTOR
George Arthur Cheetham.
BY
Wesley G. Carr
ATTORNEY

Patented Aug. 2, 1927.

1,637,370

UNITED STATES PATENT OFFICE.

GEORGE ARTHUR CHEETHAM, OF MANCHESTER, ENGLAND, ASSIGNOR TO WESTINGHOUSE ELECTRIC & MANUFACTURING COMPANY, A CORPORATION OF PENNSYLVANIA.

VOLT-AMPERE-HOUR METER.

Application filed August 19, 1922, Serial No. 582,990, and in Great Britain August 20, 1921.

My invention relates to alternating-current electric meters and particularly to kilovolt-ampere-hour meters.

One object of my invention is to provide a device of the above-indicated character that shall operate accurately over a wider range of power-factor changes than has heretofore been usual.

Another object of my invention is to provide a kilovolt-ampere-hour meter that shall be simple and durable in construction, economical to manufacture and effective in its operation.

As is well known to those versed in the art, an induction-type watt-hour meter may be adapted or compensated to read kilovolt-ampere-hours more or less accurately over a variation of phase angle of about 44° between the voltage and the current. For example, such a meter may be compensated to read with power-factors ranging from unity to 0.72 lagging or from 0.72 lagging to 0.04 lagging or any intermediate power-factor over a range equivalent to a variation in phase angle of 44°, and it may be similarly compensated for leading power factors. With phase angles on either side of the range of 44° for which the meter is compensated, the meter disc will rotate at a speed which is slower than that necessary for a true reading, as will be well understood.

According to the present invention, a plurality of watt-hour meters each compensated to read kilovolt ampere-hours over a different range of power-factors is employed and said meters are mechanically connected together, and to an integrating train, in such manner that said train will always be actuated by the meter which is driven the fastest. The meters are individually compensated so that one reads correctly from, say unity power-factor to .72 power-factor lagging and the other one reads from .72 power-factor lagging to .04 power-factor lagging, so that the total range will be from unity power-factor to substantially zero power-factor. The meters may, of course, be compensated to read over any desired consecutive ranges of power-factor.

Figure 3:
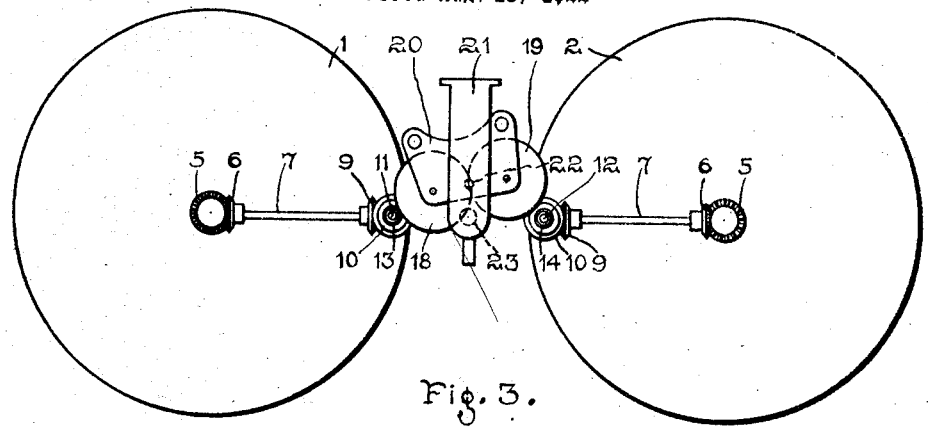
Figure 1:
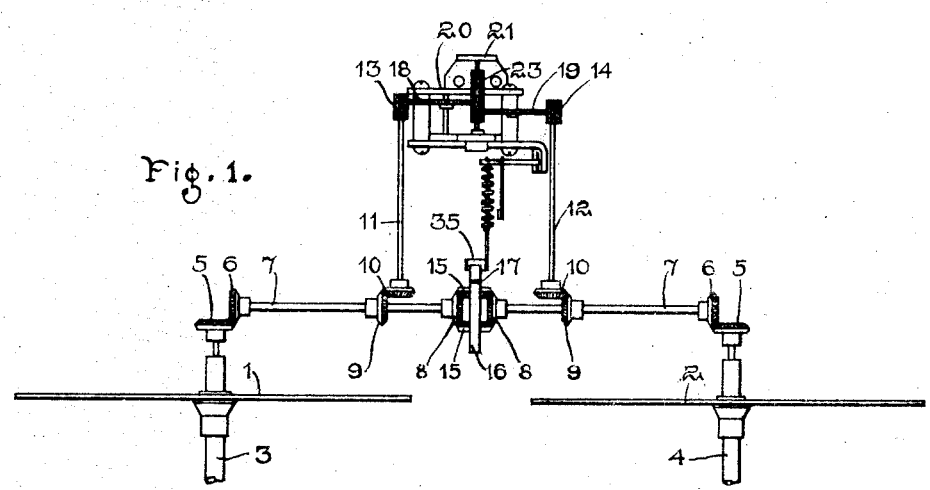
Figure 2:
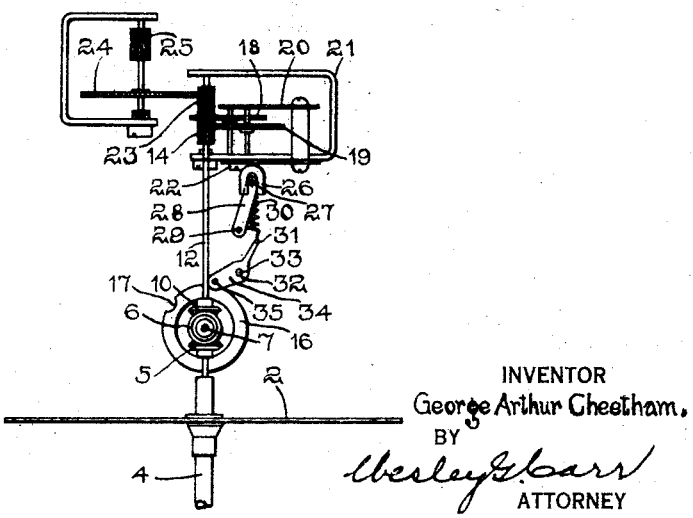

Figure 1 of the accompanying drawings is a front elevational view of a portion of an instrument constructed in accordance with my invention, and Figs. 2 and 3 are, respectively, a side elevational view and a plan view of the device shown in Fig. 1.

Two single phase or polyphase watt-hour meters, which are of the induction type and compensated to read kilovolt ampere-hours on consecutive ranges of phase angle, are provided with the usual discs 1 and 2 mounted on shafts 3 and 4, respectively, carried in bearings (not shown) in the usual manner.

Each shaft is provided, at its upper end, with a bevel wheel 5 engaging a bevel wheel 6 upon a shaft or spindle 7. The shafts or spindles 7 are mounted in alinement with one another in suitable bearings (not shown) and are provided with bevel wheels 8 at their adjacent ends. The spindles 7 are further provided with bevel wheels 9 engaging bevel wheels 10 upon the lower ends of parallel shafts 11 and 12, the upper ends of which are provided, respectively, with pinions 13 and 14.

A pair of bevel wheels 15 engage the bevel wheels 8 and are carried in a ring or frame 16 to thus constitute a differential gear mechanism. The ring or frame 16 is provided with a notch 17 for a purpose which will be hereinafter set forth. The pinions 13 and 14 are adapted to engage, respectively and alternately, toothed wheels 18 and 19, according to which of the meters is rotating the faster. The wheels 18 and 19 are carried in a bracket 20 which is pivoted to a fixed member 21 on a vertical pin 22. The toothed wheels 18 and 19 are adapted to engage a fixed pinion 23 (Figs. 1 and 2) which is permanently in engagement with a toothed wheel 24 (Fig. 2) connected to any convenient form of integrating mechanism (not shown) through a pinion 25.

A fork 26, on the underside of the pivoted bracket 20, is engaged by a pin or rod 27 carried by an upwardly extending lever 28 which is pivoted to a fixed pin or member 29. A spring 30 is connected, at one end, to the pin 27 and, at the other end, to one end 31 of a second lever 32 that is pivoted to a fixed pin 33. The other arm 34 of the lever 32 is provided with a pin or roller 35 (Fig. 1) adapted to co-operate with the notch 17 in the ring or frame 16 of the differential gear mechanism. The pivot axes of the levers 28 and 32 lie in a vertical plane so that the lever 28 can be thrown over a dead centre after the manner of a toggle link.

In operation, assuming that the spindles or shafts 3 and 4 of the respective meters are rotating in the counter-clockwise direction, as viewed from above, and that the shaft 3 of the left-hand meter is moving the faster, the pinion 13 is connected to the integrating mechanism, the power factor of the circuit to which the meters are connected being, for example, between unity and 0.72 lagging. When the power factor of the circuit drops below 0.72 lagging, that is, to a figure within the range of the right-hand meter, the latter will rotate the faster, while the speed of rotation of the left-hand meter will decrease. The right-hand bevel wheel 8 will then rotate faster than the left-hand bevel wheel 8, with the result that the ring or frame 16 will rotate in the clockwise direction (Fig. 2). As the ring or frame rotates, the pin or roller 35 will fall into the notch or depression 17 and, as the rotation of the ring 16 continues, the lever 32 will be turned about its pivot 33. Thus, the spring 30 will be extended until the direction of the pull of the spring has passed across the pivot of the lever 28, whereupon, the latter will be moved over its dead center to rock the frame 20 about the axis of the pin 22. This movement causes the wheel 19 to engage the pinions 14 and 23 and the wheel 18 to disengage the pinions 13 and 23. The right-hand meter will then operate the integrating mechanism. The ring or frame 16 will continue to rotate in the same direction, having no effect upon the lever 32 until the direction of rotation is again reversed. This reversal will occur when the left-hand meter rotates faster than the right-hand meter. The left-hand meter will rotate faster than the right-hand meter when the power factor rises to within the range to which the left-hand meter is adjusted and compensated to read.

In the arrangement above described, the mechanical portions of the meters are of fixed construction and relation. The calibration or compensation thereof is effected by means of impedance comprising suitable combinations of reactances and resistances, as will be well understood by those skilled in the art.

The left-hand meter may be so adjusted that the disc will stand with the current lagging the volts by 120° instead of 90° or there must be the same percentage error at power factors of unity and 0.72 lagging for each element. When this has been done, the meter is adjusted to be 3.8% slow at unity power factor.

It will be understood that the meters may be compensated or calibrated to read a range of power-factor corresponding to 44° of phase angle, on either side of unity power factor, or to read entirely for leading power factors.

The term "higher speed" signifies the meter disc which is rotating the faster in the positive direction, that is, algebraically. Thus, if the meters are running backwards, the disc rotating at the "higher speed" is in reality that which is running slower in the reverse direction.

While I have shown and described a particular form of my invention, changes may be effected therein without departing from the spirit and scope thereof, as set forth in the appended claims.

I claim as my invention:

1. In an instrument, the combination with an indicating means, of a plurality of actuating means therefor accurately operative over different ranges of values of a quantity to be measured, and means including a gear mechanism and a shifting device for the gear mechanism for selectively connecting said actuating means to said indicating means in accordance with a change in the value of said quantity from one of said ranges to another.

2. In an electric meter, the combination with an integrating mechanism, of a plurality of volt-ampere-hour meters severally compensated to operate accurately over different ranges of power-factor changes, and means, including gear mechanism and a shifting device for the gear mechanism, for selectively connecting said volt-ampere-hour meters to the integrating mechanism.

3. In a meter mechanism, the combination with an integrating device having a primary gear member, of a movable structure, a plurality of gear members carried by the movable structure for selective engagement with said primary gear member, a plurality of actuating shafts, gear mechanisms directly connected between said selective gear members and said shafts, an over-the-center device for moving said movable structure and a differential device connected between said shafts for actuating said over-the-center device.

4. A volt-ampere hour meter comprising a plurality of watt-hour meters adapted to register volt-ampere hours between predetermined different ranges of power factor, an indicating device, and a planetary gear system actuated by the watt-hour meters for controlling the connection of the meters to the indicating device.

5. The combination with a plurality of meters adapted to operate accurately between predetermined different ranges of values of a quantity to be measured, indicating means, and a planetary gear system actuated by the meters for controlling the connection of the meters to the indicating device.

In testimony whereof, I have hereunto subscribed my name this second day of August, 1922.

GEORGE ARTHUR CHEETHAM.